May 6, 1958     N. J. GOLDEN     2,833,986
CHARACTERISTIC CURVE TRACER
Filed July 21, 1952
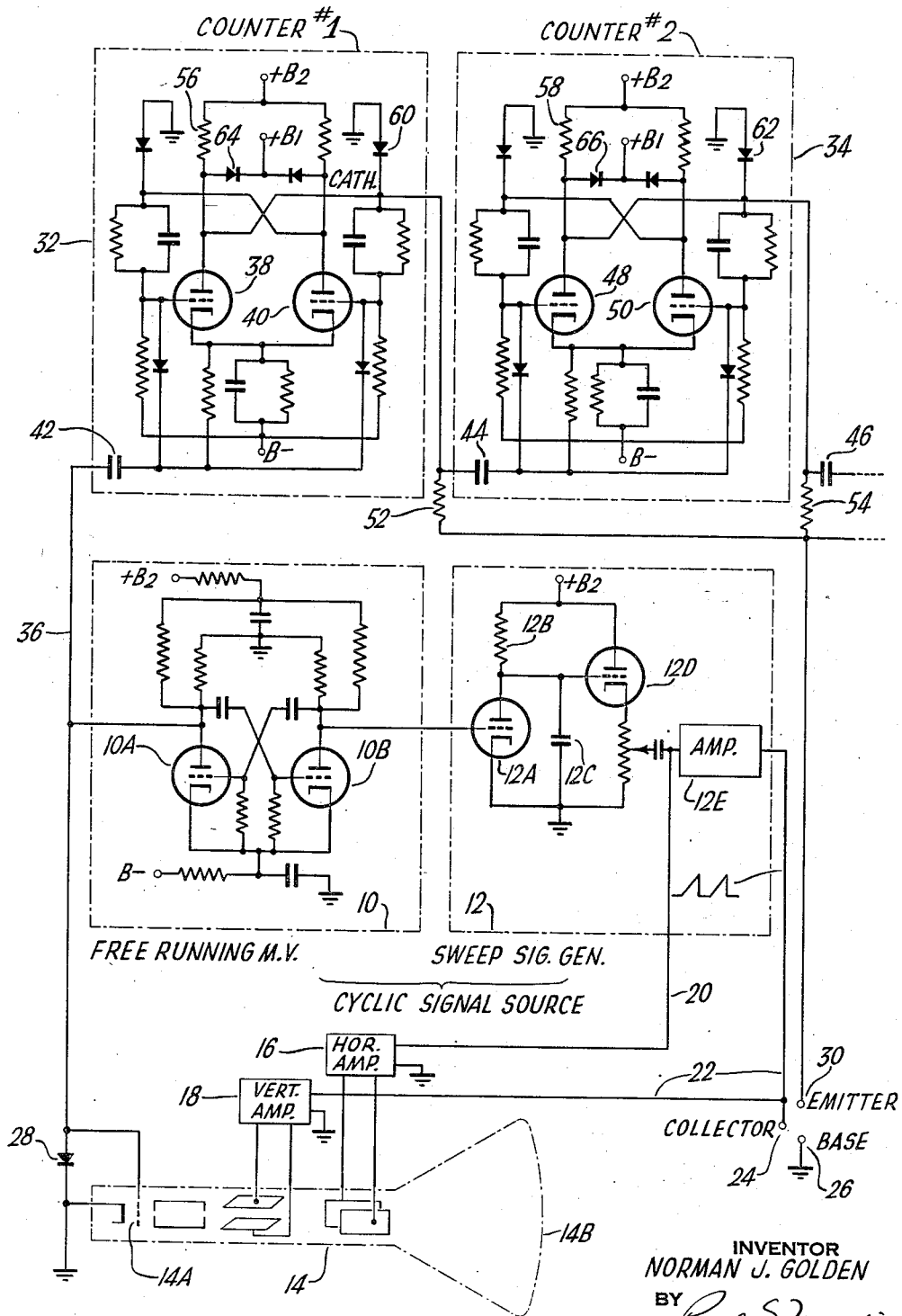
INVENTOR
NORMAN J. GOLDEN
BY
Paul S. Martin
ATTORNEY United States Patent Office 2,833,986
Patented May 6, 1958

2,833,986

CHARACTERISTIC CURVE TRACER

Norman J. Golden, Arlington, Mass., assignor to Sylvania Electric Products Inc., a corporation of Massachusetts Application July 21, 1952, Serial No. 300,078

12 Claims. (Cl. 324—57)

The present invention relates to electrical equipment for displaying characteristics of electrical devices.

The operating characteristics of electrical devices are commonly investigated by applying variable potentials to them, and at the same time measuring the resulting currents passed by them; or the characteristics may be investigated by passing known variable currents through them and at the same time measuring the resulting voltages developed across the devices. One electrical quantity is varied, and as it is varied its effect is measured. The curve of the control variable versus the resulting variable is readily displayed on a cathode ray tube, in well known practice.

Where a family of characteristics is desired, as in testing semi-conductor amplifiers and vacuum tubes and the like under several different conditions of bias voltage or current, one complete curve can be displayed for each of a series of bias values. The term "bias" is used here to denote a quantity (whether current or voltage) that is held constant during a sweep of a variable (current or voltage), but the bias may be—and usually is—changed from one value to another in developing a family of characteristics. It is quite desirable that a family of curves be displayed concurrently even though they are derived successively; for each curve is of interest not only for what it shows alone, but also because of its relationship to the several other characteristics, as is understood by those skilled in the art. Accordingly an object of the present invention is to devise a novel arrangement for displaying several characteristics of a test device concurrently which are developed under successive different conditions of bias and under variable energization during each bias condition.

In testing semi-conductor amplifiers, vacuum tubes and the like, where a large number of characteristics is desired, one of the features of the present invention resides in the provision of electronic switching enabling several bias supplies to be used in succession, rapidly, such that the characteristics taken with each supply are all displayed on a cathode ray tube concurrently within the decay time of the phosphorescent screen. Where a large number of characteristics is desired, a correspondingly large number of bias supplies would naturally be required, but for a further feature of the present invention. Accordingly to this feature, the test circuit includes an automatic arrangement for utilizing the bias supplies not only in succession but also in combinations, thereby to greatly reduce the total number of bias supplies required for a given number of characteristics in a family that is to be displayed. Thus, four different bias supplies used separately would yield but four characteristics, whereas when used separately and in combinations, sixteen characteristics are realized.

The nature of the invention will be better understood from the following detailed disclosure of an illustrative embodiment thereof, which is shown in the accompanying drawing.

The drawing is a wiring diagram, partly in block diagram form, of a presently preferred illustrative embodiment of the invention.

The circuit in the illustrative embodiment to be described in detail below is for the purpose of displaying a family of characteristics of semi-conductor triodes or transistors, now commonly made with a body of germanium or like semi-conductor having a pair of rectifying junctions and an additional ohmic junction, the rectifying junctions being sufficiently close to each other to produce interaction and usually amplification.

The types of instructive characteristics that may be obtained for any one transistor that are of interest are many and varied. The more important characteristics of these devices are produced by varying the signal current impressed at one of the electrodes and measuring the voltage developed between that electrode and another as a result of the applied signal. A family of characteristic curves is obtained when different bias conditions are suitably impressed in rapid succession during successive cycles of applied signal. Thus a series of bias currents may be passed through a semi-conductor amplifier between the emitter or input rectifying connection and the base contact, while the current variable impressed at the collector is swept through a test range for each condition of bias current at the emitter. For each sweep, the variable voltage and current at the collector is applied to the appropriate deflection systems of a cathode ray tube. The bias current that is used during each cycle of applied signal is constant during a single sweep of that applied signal. The signal itself is utilized to effect switching from one bias condition to the next during the return sweep of the cathode-ray tube.

The bias conditions are advantageously established in this embodiment by the successive stages of a cascaded electronic counter which at once serves to achieve the electronic switching and to provide the several bias currents desired. These are used in succession; and they are also used in varied combinations. While this is achieved in the illustrative embodiment by employing parallel circuits feeding currents to the single emitter, the single currents of the several counter stages and the combinations of such currents could in principle be replaced for producing bias voltages rather than currents, as by arranging the output of the several counter stages to be developed across series resistors instead.

Referring now to the drawing, a free-running multivibrator 10 is shown which produces a square-wave signal. This is utilized to develop a saw-tooth sweep signal in unit 12 whose output is of saw-tooth current wave-form despite variations in resistance of the test device on which the saw-tooth current is impressed. Accordingly the output impedance of unit 12 is made high relative to the range of resistances of the devices to be tested. Units 10 and 12 together constitute a source of cyclic signal energization for the device to be tested, or more succinctly, a test signal for the test device.

Multivibrator 10 includes two sections 10A and 10B, including the usual resistors and cross-coupling circuits having the desired time constants. Either section or the other is conductive while the other is cut off for a brief period followed by a reversal, so that at each section there is developed a square-wave signal that is oppositely phased in relation to that at the other. Since all of this is well known and no novelty resides in this circuit per se, the details need not be further elaborated herein.

Section 10B is coupled to input section 12A of unit 12, which, because of the integrating circuit including resistor 12B and condenser 12C, provides a series of saw-tooth sweep signals at adjustable-output cathode-follower section 12D. These sweep signals are converted to the proper amplitude and at the properly high impedance by any suitable impedance converting amplifier 12E.

A cathode ray oscilloscope is provided, including cathode ray tube 14, horizontal deflection amplifier 16 and vertical deflection amplifier 18. A connection 20 from a suitable point in unit 12 (as at the output of cathode-follower 12D) energizes the horizontal deflection system of the oscilloscope to represent the cyclic current variation produced. Connection 22 actually applies that current at terminal 24 for the collector of a test transistor, for return via terminal 26 for the base of the transistor and ground, the same connection 22 also applying the voltage variation developed between the collector of the test transistor and ground to the vertical deflection system of the oscilloscope.

Multivibrator 10 produces a square-wave at section 10A that is coupled to on-off or intensity-control grid 14A of the cathode-ray tube 14. This connection is effective, by appropriate phasing relative to the signal at connection 22, to blank the oscilloscope during the return sweeps of the cathode-ray beam, after producing a trace under control of the saw-tooth sweep signal. Diode 28 connected between the cathode and the grid of the cathode-ray tube is effective to limit the positive rise of voltage at grid 14A during times when the cathode-ray beam is "on."

The foregoing is effective to impress the current and voltage variables on a test device and for displaying a single characteristic curve representing operation of the test device under a single bias condition. Thus, if any fixed current is impressed at terminal 30 for the emitter of a test transistor for return via terminal 26 and ground, a single trace will be developed at screen 14B. If the emitter bias current is later changed, another characteristic will be developed at screen 14B. A feature of this invention resides in electronic switching among several bias supplies, energized in time with the cyclic sweep signal source, to the end that the several characteristics obtained under several conditions of bias in successive sweep cycles may be simultaneously viewed on the screen 14B of the oscilloscope. The sequence of cycles for developing all the characteristics need be only so rapid as to insure concurrent display of the traces, by virtue of the persistence of the cathode-ray tube screen.

The electronic switches for the several bias supplies, and those supplies themselves, appear in the upper half of the drawing. Two bi-stable multivibrators or flip-flops 32 and 34 are shown which in all respects are alike; and being internally of no controlling interest, they are only briefly discussed. While only two flip-flop units are shown, a suitably long cascade of flip-flops is contemplated, four being considered highly desirable. The first flip-flop has an input connection 36 to the cyclic signal source, in particular to section 10A of free-running multivibrator 10, while each of the others in the cascade is energized by signal coupling to the preceding flip-flop in the cascade. Those skilled in the art will recognize the cascade of flip-flops as a scale-of-two counter. Flip-flop 32, also designated "Counter #1" in the drawing, includes two vacuum tube sections 38 and 40 each of which is conductive while the other is blocked; and they remain in that condition by virtue of the grid-control resistors shown until reversed by an input pulse. Such pulse commences conduction in the previously blocked section which, by cross-coupling from the plate of each section to the grid of the other, blocks conduction in the other section. This action is entirely conventional and accordingly need not be further detailed.

Signal input to "Counter #1" or flip-flop 32 is applied via direct current blocking pulse-transmitting condenser 42 coupled to multivibrator 10, and similarly signal input to flip-flop 34 or "Counter #2" is coupled from flip-flop 32 via condenser 44. A further coupling condenser 46 is shown from the next stage in the cascade, if desired.

One of each pair of sections 38 and 40 of flip-flop 32, and sections 48 and 50 of flip-flop 34 is conductive at all times, while the other section of that flip-flop is blocked. Section 38 has its anode wired to a resistor 52 and similarly section 48 has its anode wired to resistor 54, resistors 52 and 54 having common connection to emitter energizing terminal 30. A resistor 56 serves as a plate load for section 38 and similarly resistor 58 serves as a plate load of section 48. Resistors 56 and 58 are connected to a high voltage point above ground potential, and accordingly when either or both of sections 38 and 48 are blocked, there is a minimum voltage drop in its resistor 56 or 58, with the result that terminal 30 is driven positive in relation to ground. When sections 38 and 48 are conductive, their drain of current through the respective resistors 56 and 58 drops the voltage at the respective anodes to ground potential, and no current is delivered via resistors to terminal 30 for the emitter of a test device. Clamping diodes 60 and 62 connected to resistors 52 and 54 and to ground insure a minimum of ground potential at those resistors while clamping diodes 64 and 66 connected to those resistors and to a positive voltage tap fix the maximum voltage above ground that is impressed on resistors 52 and 54.

Resistors 52, 54 and others that may be connected to the cascaded counter units are successively of approximately halved values. Accordingly it is seen that current delivered via resistor 52 to terminal 30 (when a relatively low-resistance test element is connected there) is only half that delivered via resistor 54. No current reaches terminal 30 when sections 38 and 48 are both conductive. An impulse from unit 10 renders section 38 non-conductive and delivers a certain unit current to the device at terminal 30. Unit 34 and its current-supplying resistor 54 are unaffected by such pulse. The succeeding pulse renders section 38 conductive once more, interrupting the current supplied via resistor 52; but the same impulse renders section 48 non-conductive and transmits current via resistor 54 to the test device at terminal 30. This current is just twice that delivered by resistor 52. The next impulse from unit 10 renders section 38 non-conductive and does not affect unit 34. As a result, the combined currents supplied separately by resistors 52 and 54 reach the test device at terminal 30, that is, three times the current supplied by resistor 52 alone. Four bias conditions are thus obtained at terminal 30 by successive and combined use of the two bias current supplies 52 and 54 and their associated electronic switching circuits. Four such supplies yield sixteen bias conditions.

As previously stated, the bias changes are effected under control of the cyclic sweep signal source and during the application of blanking voltage to the intensity control grid 14A, and during the return-sweep of the cathode ray beam. The phasing is arranged so that the selected bias is sustained during the next succeeding saw-tooth signal which produces the characteristic trace on the cathode ray screen 14B. The succession of traces produced under the succeeding bias conditions are all simultaneously viewed, because of their rapid succession and the inherent persistence of the screen. The family of characteristics thus produced yields important information by their relationship that is not obtained from the several characteristics viewed separately, as will be appreciated by those versed in the art.

The foregoing embodiment of the invention is of special value in that both bias and signal currents are produced that are best suited to producing transistor characteristics. The principles will be recognized as extending also to the provision of bias and signal voltages; and other applications and modifications may be made by those skilled in the art. Accordingly, it is appropriate that the appended claims be accorded broad interpretation, consistent with the spirit and scope of this invention.

I claim:
1. In combination, a series of bias supplies having selective control circuits, a cyclically variable signal source, terminal connections for applying cyclic energization to a test device and for applying bias from said bias supplies to the test device, and control connections between said cyclically varying source of energization and said selective control circuits effective in successive cycles to change the bias available at the test terminals during application of successive energizing cycles.

2. In combination, a cyclically varying source of energization having output connections to a set of terminals for a device to be tested, a plurality of bias power supplies having electronic switching means rendering the bias supplies effective selectively and having connections to said set of terminals for a device to be tested, a control connection from said cyclically varying source of energization to said electronic switching means for successively changing the condition thereof, and an oscilloscope having the deflection system thereof coupled to said device under test for concurrently displaying the successive operating characteristics obtained during cyclic variations of energization and during the successive applications of bias.

3. Apparatus for energizing a test electrical device and for displaying characteristics thereof, including a cyclically variable source of signal energization having terminal connections for a device to be tested, a plurality of bias supplies also having connections to terminals for a device to be tested, said bias supplies having electronic switching means effective to render the bias supplies selectively effective, a synchronizing control connection between said source of signal energization and said electronic switching means effective to change the switching during successive signal cycles, a display device having an on-off control and having a deflection system, said deflection system being coupled to the signal-energizing connections of said test device and said on-off control being coupled to said source of signal energization, said synchronizing connection and said connection to the on-off device being concurrently effective to change the bias supply selection and to blank the display device during one portion of the signal cycle, and being effective to maintain the bias supply selection and to render the display device effective during another portion of the signal cycle.

4. Apparatus for applying test energization to a test electrical device and for displaying characteristics of the test device, including a cyclically variable signal source, a plurality of bias supplies having cascaded switching means rendering the supplies effective selectively, both individually and in combination, connections from said bias supplies and said signal source to terminals for an electrical device to be tested, and a synchronizing control connection between said signal source and said cascaded switching means effective to change the condition of the switching means during succeeding signal cycles.

5. Apparatus for testing an electrical device and for displaying characteristics thereof, including a cylically variable signal source, a plurality of bias power supplies having cascaded switching means effective to render the bias supplies selectively effective individually and in combination, a synchronizing connection between said signal source and said cascaded switching means, and an oscilloscope having deflection energization connections to the device under test for displaying the characteristics thereof during successive signal cycles and during the successive selective applications of bias.

6. Apparatus in accordance with claim 5, wherein said oscilloscope embodies an on-off control coupled to said signal source for rendering the oscilloscope alternately ineffective and effective respectively during the change of bias energization under control of synchronizing connection and during the maintenance of the selective bias.

7. Apparatus for testing electrical devices differently operable under different conditions of bias current, including a cyclically variable source of signal energization and a plurality of current sources connected to terminals for a test device, said current sources having a common connection and having switching means rendering them selectively effective, and synchronizing control connections between said signal source and said switching means for successively changing the condition of the latter during successive signal cycles.

8. Apparatus for testing electrical devices under various conditions of signal and bias current and for displaying a family of characteristics thereof, said apparatus including an oscilloscope having a deflection control system connected to a set of terminals for a device to be tested, a cyclically variable source of energization connected to said set of terminals for the test device, a plurality of bias current supplies having a common connection to said set of terminals for the test device, and electronic switching means effective to render said bias current supplies selectively effective, said switching means and said signal source having a synchronizing connection effective to change the bias current selection successively.

9. Apparatus in accordance with claim 8 wherein said oscilloscope has a synchronizing connection to said signal source timed to render the oscilloscope inoperative during the times when the switching means changes the bias supply selection.

10. Apparatus for testing an electrical device and for displaying the characteristics thereof, comprising in combination a variable voltage signal source having cyclically variable output connection to a set of terminals for a device to be tested, a cascaded series of electronic counters each having a portion of the output thereof connected as bias supplies in energizing relation to said set of test device energizing terminals, an energizing connection from said signal source to the unit-counting portion of said cascaded counter effective during each energization to advance the counter one unit during each cycle of the signal source thereby to utilize the bias supplies selectively and in selected combinations, and a display device having a deflection system coupled to said set of test terminals for displaying a family of characteristics of the device under test during the successive applications of bias from the several bias supplies.

11. Apparatus for testing an electrical device under conditions of cyclically varying energization and stepwise changing bias, including a cyclically varying signal source having energizing connections to a set of terminals for a test device, a cascaded series of bi-stable flip-flop stages having input connection to said signal source, a resistor connected to one-half of each flip-flop unit, each of the resistors having connection to a common one of said test terminals, an oscilloscope having a blanking control and having a deflection system, said deflection system being connected to the connections for the test device and said blanking control being connected to said signal source and phased in relation to the input connection of the cascaded flip-flop stages so that the oscilloscope is blanked during the change of bias supply effected by the flip-flop circuits.

12. Apparatus in accordance with claim 11, wherein said resistors are of successively halved values along the cascaded stages.

References Cited in the file of this patent
UNITED STATES PATENTS

| 2,580,083 | Doba et al. | Dec. 25, 1951 |
| 2,590,116 | Moland et al. | Mar. 25, 1952 |
| 2,616,058 | Wagner | Oct. 28, 1952 |

OTHER REFERENCES

Chaplin: Article entitled: "Display of Transistor Characteristics on the Cathode-Ray Oscillograph," Journal of Scientific Instruments, vol. 29, No. 5, May 1952, pages 142–145.